United States Patent
Evans

[15] 3,695,563
[45] Oct. 3, 1972

[54] HYDRAULIC LINE FITTING SUPPORT APPARATUS

[72] Inventor: Theodore D. Evans, 15134 29 Mile Road, Romeo, Mich. 48065

[22] Filed: June 1, 1970

[21] Appl. No.: 42,201

[52] U.S. Cl. ..................... 248/56, 248/58 CB
[51] Int. Cl. .......................................... F16l 5/00
[58] Field of Search ...248/68 CB, 68, 56; 174/149 B, 174/149 R, 148, 156, 157; 138/112

[56] References Cited

UNITED STATES PATENTS

| | | |
|---|---|---|
| 678,042 | 7/1901 | Sargent..............248/68 CB X |
| 3,414,220 | 12/1968 | Walker.................248/68 CB |
| 2,417,260 | 3/1947 | Morehouse........248/68 CB X |
| 525,708 | 9/1894 | Herrick..............248/68 CB X |
| 2,732,226 | 1/1956 | Brattberg.................248/56 X |
| 1,822,475 | 9/1931 | Burke........................138/112 |

FOREIGN PATENTS OR APPLICATIONS 6,402,871  2/1965  Netherlands ................248/68

Primary Examiner—Chancellor E. Harris
Attorney—McGlynn, Reising, Milton & Ethington

[57] ABSTRACT

Apparatus for securing hydraulic lines and the like including bulkhead plates which receive standard hydraulic fittings, channel members for supporting a two-dimensional array of plates and bolts for interconnecting the channel members and plates into a rigid assembly.

1 Claim, 4 Drawing Figures

PATENTED OCT 3 1972
3,695,563
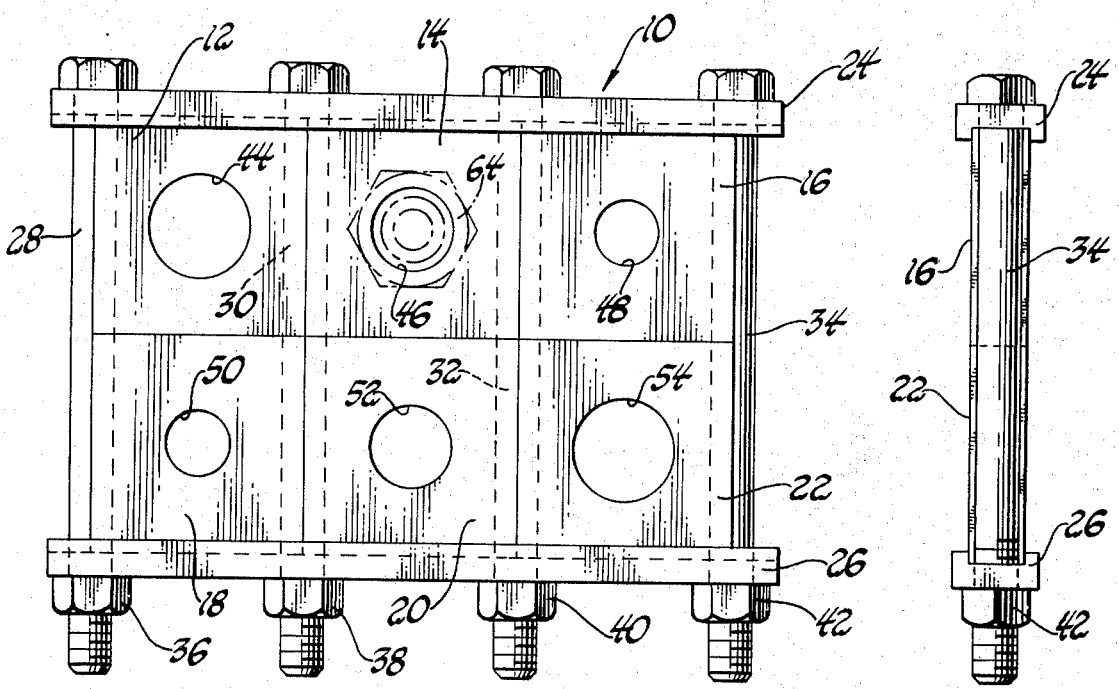
Fig. 1  Fig. 2
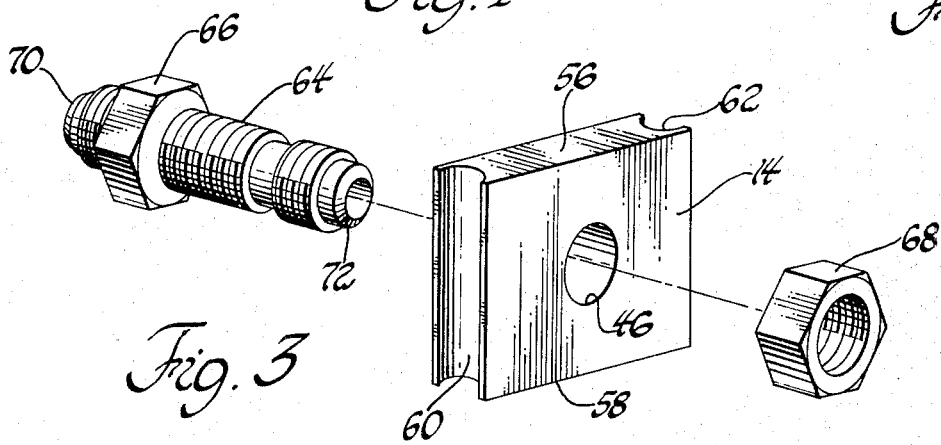
Fig. 3
Fig. 4
INVENTOR.
Theodore D. Evans
BY
Barnard, McGlynn & Reising
ATTORNEYS

HYDRAULIC LINE FITTING SUPPORT APPARATUS

This invention relates to apparatus for supporting hydraulic lines and the like and particularly to an adjustable assembly for supporting a plurality of hydraulic lines by the support of fittings in those lines.

It is generally desirable to secure and support the various hydraulic fluid lines which are found in hydraulic apparatus. Such support may be desirable or required at a flex point, where one or more such lines is carried overhead through a distance which requires intermediate support, where one or more such lines are to maintained in spaced relationship with another object or simply where several such lines come together and it is desirable to organize them for identification purposes. These are but a few examples and others will occur to those skilled in the art. The securement and support of such lines is most often accomplished by a support apparatus which cooperates with a line fitting such as a fluid coupling. Such couplings are generally of the lock nut type and are of a highly standardized design. It is desirable, therefore, to employ a support apparatus which accepts standard design fittings.

It is typical in hydraulic installations to alter the hydraulic line design by the addition or subtraction of lines or by a change in the type or size of the fitting which is found in such a line. Therefore, it is also desirable to employ a support apparatus which is adjustable or alterable to the extent of readily permitting the number of lines supported to be increased or decreased as well as permitting the type and size of coupling to be altered without the corresponding need to redesign the entire support structure.

The present invention provides a readily alterable apparatus for the support of hydraulic line fittings, an apparatus which readily accepts standard lock nut fittings and an apparatus which is easily assembled into a rigid unit to support one or a plurality of hydraulic lines. In general this is accomplished by the use of solid bulkhead plates which receive standard hydraulic fittings through holes of a size which is selected to correspond with that of the fitting, channel members which clamp the plates in a two-dimensional array, and means such as bolts which extend between the channel members and which lockingly cooperate with grooved peripheral edges in the bulkhead plates to provide a rigid assembly in which the various bulkhead plates can be easily interchanged with similar plates of the same or other hole sizes and which readily permits changes in the size of the two-dimensional array.

In a preferred embodiment of the invention to be described herein, the bulkhead plates are substantially square members having a central hole which extends between opposite parallel surfaces, a first set of parallel and opposite peripheral edges which are flat and a second set of parallel and opposite peripheral edges which are semi-circularly grooved. The channel members of the preferred embodiment are provided with channeled surfaces to receive and secure the ungrooved or flat edges of the plates, the plates being preferably stacked edge-to-edge in a two-dimensional array. The grooved edges of the plate are thus placed in parallel continuous fashion among plates of common vertical orientation and in face-to-face relationship among adjacent plates in a horizontal orientation, the face-to-face grooves defining openings extending between the channel members to receive bolts. These bolts secure the opposite channel members together and cooperate with the grooved edges of the bulkhead plates to provide the rigid support assembly.

The invention may be best understood by reference to the following specification which describes a specific embodiment thereof. This specification is to be taken with the accompanying drawings of which:

FIG. 1 is a view of an illustrative embodiment of the invention adapted to support six hydraulic line fittings;

FIG. 2 is a side view of the assembly of FIG. 1;

FIG. 3 is an exploded view of a single bulkhead plate and fitting; and

FIG. 4 is a perspective view of a single channel member from the assembly of FIG. 1.

Referring to FIG. 1, the invention is shown embodied in an assembly 10 for the support of up to six hydraulic line fittings of the lock nut type. Assembly 10 comprises solid metal bulkhead plates 12, 14, 16, 18, 20 and 22 which are arranged in a two-by-three array between a pair of parallel, oppositely disposed but identical channel members 24 and 26. The channel members 24 and 26 are secured together by means of elongated hex head bolts 28, 30, 32 and 34 and hex head nuts 36, 38, 40 and 42. The bulkhead plates 12, 14, 16, 18, 20 and 22 are provided with centrally located circular holes 44, 46, 48, 50, 52 and 54 respectively which extend completely through the plates between the opposite plane surfaces thereof. The holes may be of the same or various sizes to receive bulkhead fittings of corresponding sizes for hydraulic line support purposes as will become more apparent hereinafter. In FIG. 1, holes 44 and 54 are large, holes 48 and 50 small, and holes 46 and 52 of intermediate size.

Looking now to FIG. 3, bulkhead plate 14 is shown in detail and will be described as being representative of all of the bulkhead plates shown in the assembly 10 of FIGS. 1 and 2.

Bulkhead plate 14 is fabricated in solid form from a light, machinable material such as aluminum and has a first set of flat parallel and opposite peripheral edges 56 and 58. The other parallel and opposite peripheral edges 60 and 62 are provided with semi-circular grooves which extend the entire length of those edges to cooperate with the bolts 30 and 32 as shown in FIG. 1. Hole 46 is disposed centrally of the plate 12 and extends fully between the opposite plane surfaces thereof.

Bulkhead plate 14 may be fabricated by extruding aluminum stock in continuous lengths of eight feet or more having the continuous grooves 60 and 62 already formed therein and then by drilling the holes 46 and cutting the stock into the proper size squares. Although the square shape illustrated in FIGS. 1 and 3 is preferred, it is of course recognized that the bulkhead plate 14 may be fabricated in a rectangular shape as well. The plate 14 is preferably either 1½ or 2 inches on a side, but other sizes are also contemplated. A width-to-thickness ratio of at least 4:1 is contemplated.

Bulkhead plate 14 cooperates with a standard hydraulic line fitting 64 having a fixed nut portion 66 and being properly threaded to receive a lock nut 68. Fitting 64 is provided with longitudinally opposite coupling portions 70 and 72 to receive hydraulic lines and clamping nuts thereon. Fitting 64 is of course provided with a longitudinal bore to permit the flow of hydraulic fluid and the like therethrough. It is to be understood that the fitting 64 shown in FIG. 3 is purely illustrative in nature and that other fittings such as elbows and T's may also be used with the bulkhead plate 14 of the illustrative embodiment.

Referring now to FIG. 4, channel member 26 from the assembly 10 of FIG. 1 is shown as representative of both channel members 24 and 26. As seen in FIG. 4, the channel member 26 is a flat, elongated metal member such as aluminum having machine in one face thereof a rectangular channel 74 having a width between the lips 76 and 78 which is substantially equal to the thickness of the bulkhead plate 14 of FIG. 3. In addition, a plurality of holes 80 are bored through the channel member 26 within the channel 74 and spaced a distance apart which is substantially equal to the edge length of the bulkhead plate 14 of FIG. 3. In actual practice, both the width of the channel 74 and the spacing between the centers of the holes 80 is slightly larger than the thickness of the bulkhead plate 14 and the edge length, respectively, to permit easy assembly.

The operation of the assembly 10 and the various elements thereof is as follows. Assuming one wishes to support up to six hydraulic lines having line fittings 64 of various sizes therein, one selects up to six bulkhead plates 12, 14, 16, 18, 20 and 22 which correspond to the line fittings 64 to be used. One first assembles the line fittings 64 to the bulkhead plates by the procedure clearly indicated in FIG. 3. The fitting 64 is disassembled from the lock nut 68 and is inserted through the unthreaded hole 46 in the bulkhead plate 14 until the fixed nut 66 engages one surface of the bulkhead plate 14. The lock nut 68 is then threaded onto the fitting 64 until it engages the opposite plane surface of the bulkhead plate 14. This locks the fitting 64 into place in the bulkhead plate 12. The corresponding steps are followed for all of the bulkhead fittings and all of the bulkhead plates.

A pair of channel members 24 and 26 of proper length, i.e. a length corresponding to the number of bulkhead plates to be disposed thereon, is selected. A supply of channel members of various lengths may be kept on hand. Bolts 28, 30, 32 and 34 of the proper length are inserted through the holes 80 in the lower channel member 26. The bulkhead plates are then stacked with the flat peripheral edges 56 and 58 in engagement with one another and placed between the adjacent bolts such that the bolts extend along and within the semi-circularly grooved peripheral edges 60 and 62. All three stacks of bulkhead plates are disposed in the proper place, the other channel members placed over the bolts, and the nuts 36, 38, 40 and 42 are threaded onto the ends of the bolts 28, 30, 32 and 34, respectively, and tightened down to rigidify the structure. Since the spacing between the holes 80 corresponds substantially to the edge dimension of the bulkhead plate 14, a close fitting assembly as shown in FIG. 1 results wherein the bulkhead plates are allowed little or no lateral displacement relative to one another or relative to the channel members 24 and 26. The channels 74 in the channel members 24 and 26 permit no fore-and-aft displacement looking at the assembly 10 from the viewpoint of FIG. 2.

From the foregoing it can be seen that a hydraulic line fitting support assembly 10 of almost any vertical and horizontal dimension can be quickly and easily assembled using the basic building block components illustrated herein. One merely maintains a stock of bulkhead plates 14 having holes 46 of the proper size and using those bulkhead plates in the proper way builds the assembly 10 of FIG. 1 to meet his particular needs. The assembly 10 is easily altered by way of expansion or reduction in size and bulkhead plates 12 of various sizes are easily interchanged with one another.

The embodiments of the invention in which an exclusive property or privilege is claimed are defined as follows:

1. Apparatus for supporting a plurality of hydraulic lines and the like in spaced relation comprising: at least two solid and rigid bulkhead plates of substantially flat and rectangular configuration, each of said plates having four perpheral edges and two flat faces, an opposite pair of said edges being formed with a semicircular groove along the entire lengths thereof, a center hole through each of the plates and between the faces thereof, a hollow threaded bulkhead fitting disposed through one of said holes to receive said hydraulic line and to act as a connector therein and including a threaded body disposed in the hole, a fixed nut on the body and bearing against one of said faces and a removable nut threadedly rotatable on the body and into engagement with the other of said faces to lock the fitting into said plate, said center hole being of such dimension as to closely accommodate said fitting, a pair of elongated rigid channel members each having in one surface thereof a channel for receiving a peripheral edge of one of the plates, said channel members further having holes extending therethrough and spaced longitudinally there along at intervals at least approximately equal to the width of the bulkhead plates between the grooved peripheral edges, said bulkhead plates being stacked one on top of the other such that the grooved edges are in alignment, said channel members being disposed along the opposite exposed edges of the plates such that the plates are secured between said channel members with the grooved edges in substantial alignment with holes on opposite ones of said channel members, and at least a pair of long bolts extending between said channel members and through the holes thereof to secure the channel members relative to the bulkhead plates and to lie in and along the grooves in the peripheral edges of the bulkhead plates to prevent displacement between said plates and channel members.

* * * * *